(12) United States Patent
Lotter

(10) Patent No.: US 12,309,739 B2
(45) Date of Patent: May 20, 2025

(54) SENSING AND COMMUNICATING SITUATIONAL AWARENESS DATA WITH DISTRIBUTED ANTENNA SYSTEMS

(71) Applicant: Nextivity, Inc., San Diego, CA (US)

(72) Inventor: Michiel Petrus Lotter, San Diego, CA (US)

(73) Assignee: Nextivity, Inc., San Diego, CA (US)

( * ) Notice: Subject to any disclaimer, the term of this patent is extended or adjusted under 35 U.S.C. 154(b) by 400 days.

(21) Appl. No.: 17/384,331

(22) Filed: Jul. 23, 2021

(65) Prior Publication Data

US 2021/0352612 A1 Nov. 11, 2021

Related U.S. Application Data

(63) Continuation-in-part of application No. 17/328,981, filed on May 24, 2021, now Pat. No. 11,785,574, and
(Continued)

(51) Int. Cl.
*H04W 64/00* (2009.01)
*H04W 4/33* (2018.01)
(Continued)

(52) U.S. Cl.
CPC ........... *H04W 64/003* (2013.01); *H04W 4/33* (2018.02); *H04W 4/38* (2018.02); *H04W 84/18* (2013.01)

(58) Field of Classification Search
CPC ....... H04W 64/003; H04W 4/33; H04W 4/38; H04W 84/18; H04L 67/12
See application file for complete search history.

(56) References Cited

U.S. PATENT DOCUMENTS 11,019,593 B2 5/2021 Lotter
2003/0234725 A1 12/2003 Lemelson et al.
(Continued)

FOREIGN PATENT DOCUMENTS

WO 2019204205 A1 10/2019

OTHER PUBLICATIONS

U.S. Appl. No. 17/141,180, "Final Office Action", Feb. 10, 2023, 24 pages.
(Continued)

*Primary Examiner* — Brandon J Miller
(74) *Attorney, Agent, or Firm* — FisherBroyles LLP; James P. Cleary

(57) ABSTRACT

A system for communicating between a building and a first responder is disclosed. The system includes a plurality of sensors, each configured to sense an aspect or condition of an environment of the building, and to transmit a sense signal representing the sensed aspect or condition. The system also includes one or more repeaters, configured to receive the sense signals from the sensors and to transmit repeated sense signals representing the sensed aspects or conditions. The system also includes a processor, configured to receive the repeated sense signals and to transmit an output signal based at least in part on one or more of the repeated sense signals, and one or more output devices configured to receive the output signal and to communicate information associated with the sensed aspect or condition based on the output signal.

25 Claims, 9 Drawing Sheets

Related U.S. Application Data a continuation-in-part of application No. 16/853,646, filed on Apr. 20, 2020, now abandoned, said application No. 17/328,981 is a continuation of application No. 16/442,383, filed on Jun. 14, 2019, now Pat. No. 11,019,593.

(60) Provisional application No. 63/009,887, filed on Apr. 14, 2020, provisional application No. 62/836,548, filed on Apr. 19, 2019, provisional application No. 62/684,983, filed on Jun. 14, 2018.

(51) Int. Cl.
*H04W 4/38* (2018.01)
*H04W 84/18* (2009.01)

(56) References Cited

U.S. PATENT DOCUMENTS

| | | | |
|---|---|---|---|
| 2005/0275528 A1* | 12/2005 | Kates | G08B 25/009 340/539.22 |
| 2006/0041395 A1* | 2/2006 | Ruelke | A62B 99/00 702/75 |
| 2006/0125630 A1 | 6/2006 | Parkulo | |
| 2007/0096901 A1 | 5/2007 | Seeley et al. | |
| 2007/0103292 A1 | 5/2007 | Burkley et al. | |
| 2010/0226259 A1* | 9/2010 | Desmond | H04L 67/564 370/242 |
| 2010/0280796 A1 | 11/2010 | Ramin et al. | |
| 2010/0280836 A1 | 11/2010 | Lu et al. | |
| 2011/0285516 A1* | 11/2011 | Ritter | H04W 88/04 370/276 |
| 2013/0053063 A1 | 2/2013 | McSheffrey | |
| 2013/0109406 A1 | 5/2013 | Meador et al. | |
| 2013/0147627 A1 | 6/2013 | Svenning | |
| 2013/0151979 A1 | 6/2013 | Snider et al. | |
| 2013/0157559 A1 | 6/2013 | Flammer, III et al. | |
| 2013/0162534 A1 | 6/2013 | Chen et al. | |
| 2013/0268127 A1 | 10/2013 | Casilli et al. | |
| 2014/0135040 A1* | 5/2014 | Edge | G01C 5/06 455/456.6 |
| 2014/0278060 A1 | 9/2014 | Kordari et al. | |
| 2015/0046582 A1 | 2/2015 | Gelvin et al. | |
| 2015/0091757 A1 | 4/2015 | Shaw et al. | |
| 2015/0365246 A1 | 12/2015 | Kane | |
| 2016/0119424 A1 | 4/2016 | Kane et al. | |
| 2016/0180663 A1 | 6/2016 | McMahan et al. | |
| 2016/0210790 A1 | 7/2016 | Rasane et al. | |
| 2016/0286363 A1 | 9/2016 | Vincent et al. | |
| 2016/0295495 A1 | 10/2016 | Lotter et al. | |
| 2016/0298969 A1 | 10/2016 | Glenn, III et al. | |
| 2017/0094524 A1* | 3/2017 | Mazzarella | H04L 63/0861 |
| 2017/0264604 A1 | 9/2017 | Drako et al. | |
| 2017/0311131 A1 | 10/2017 | South et al. | |
| 2018/0054713 A1 | 2/2018 | South et al. | |
| 2018/0139517 A1 | 5/2018 | Schwartz et al. | |
| 2018/0262916 A1* | 9/2018 | Polley | H01Q 21/28 |
| 2018/0356241 A1 | 12/2018 | Correnti et al. | |
| 2019/0096232 A1 | 3/2019 | Wedig et al. | |
| 2019/0149664 A1 | 5/2019 | Wojtunik | |
| 2019/0174208 A1 | 6/2019 | Speicher et al. | |
| 2019/0295207 A1 | 9/2019 | Day et al. | |
| 2019/0295386 A1 | 9/2019 | Roberts | |
| 2019/0370805 A1 | 12/2019 | Van Os et al. | |
| 2019/0372650 A1 | 12/2019 | Takii et al. | |
| 2020/0100246 A1 | 3/2020 | Stefanik et al. | |
| 2020/0225110 A1* | 7/2020 | Knauss | G08B 21/182 |
| 2020/0274626 A1 | 8/2020 | Leaf et al. | |
| 2020/0334470 A1 | 10/2020 | Abeykoon et al. | |
| 2020/0334778 A1 | 10/2020 | Lotter | |

OTHER PUBLICATIONS

U.S. Appl. No. 17/328,981, "Notice of Allowance", Feb. 15, 2023, 7 pages.
Non-Final Office Action dated Oct. 25, 2022 for U.S. Appl. No. 17/328,981, 13 pages.
International Search Report and Written Opinion dated Dec. 8, 2022 for International Application No. PCT/US2022/037681, 10 pages.
U.S. Appl. No. 16/853,646, Non Final Office Action, Mailed on Jul. 7, 2022, 18 pages.
U.S. Appl. No. 17/141,180, Final Office Action, Mailed on Apr. 6, 2022, 21 pages.
U.S. Appl. No. 17/141,180, Non-Final Office Action, Mailed on Feb. 2, 2022, 22 pages.
U.S. Appl. No. 17/141,180, Non-Final Office Action, Mailed on Jul. 7, 2022, 24 pages.
Application No. EP19820504.9, Extended European Search Report, Mailed on Feb. 4, 2022, 8 pages.
Holmberg et al., "Delivering Building Intelligence to First Responders", NIST Technical Note 1648, Available Online At: http://dx.doi.org/10.6028/NIST.TN.1648, Feb. 2013, pp. 1-17.
Application No. PCT/US2019/037381, International Preliminary Report on Patentability, Mailed on Dec. 24, 2020, 7 pages.
Application No. PCT/US2019/037381, International Search Report and Written Opinion, Mailed on Aug. 30, 2019, 9 pages.
Application No. PCT/US2020/029025, International Search Report and Written Opinion, Mailed on Jul. 17, 2020, 9 pages.
Application No. PCT/US2022/011167, International Search Report and Written Opinion, Mailed on Mar. 28, 2022, 11 pages.

* cited by examiner

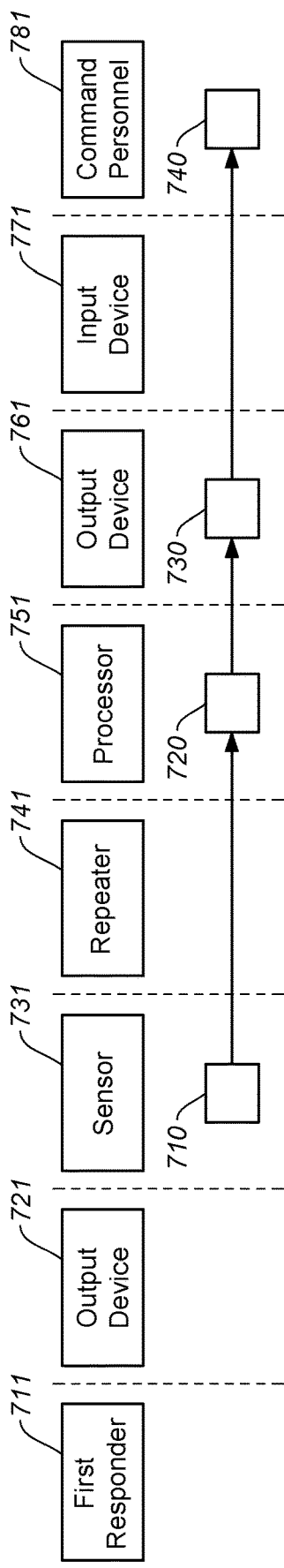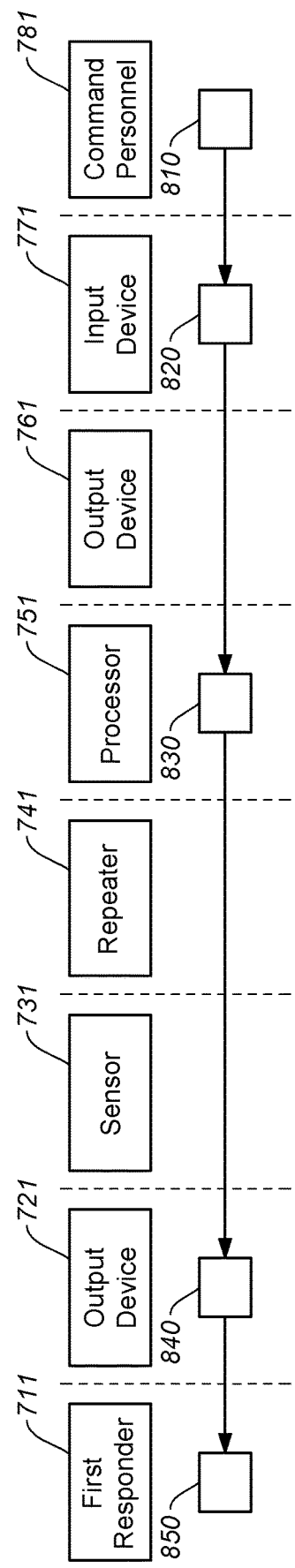

SENSING AND COMMUNICATING SITUATIONAL AWARENESS DATA WITH DISTRIBUTED ANTENNA SYSTEMS

CROSS-REFERENCES TO RELATED APPLICATIONS

This application is a continuation-in-part of U.S. application Ser. No. 17/328,981, entitled "INTEGRATED SYSTEM FOR COMMUNICATION AND SENSING FOR DISTRIBUTED ANTENNA SYSTEMS," and filed on May 24, 2021, which is a continuation of U.S. application Ser. No. 16/442,383, U.S. Pat. No. 11,019,593, entitled "INTEGRATED SYSTEM FOR COMMUNICATION AND SENSING FOR DISTRIBUTED ANTENNA SYSTEMS," and filed on Jun. 14, 2019, which claims priority to U.S. Provisional Application No. 62/684,983 filed on Jun. 14, 2018, the entirety of each which are hereby incorporated by reference herein.

This application is also a continuation-in-part of U.S. application Ser. No. 16/853,646, entitled "SYSTEMS AND METHODS FOR PROVIDING SITUATIONAL AWARENESS TO FIRST RESPONDERS," and filed on Apr. 20, 2020, which claims the benefit of U.S. Provisional Application No. 63/009,887, filed Apr. 14, 2020, and entitled "SYSTEMS AND METHODS FOR PROVIDING SITUATIONAL AWARENESS TO FIRST RESPONDERS", and U.S. Provisional Application No. 62/836,548, filed Apr. 19, 2019, and entitled "SYSTEM FOR PROVIDING SITUATIONAL AWARENESS TO FIRST RESPONDERS", the entire contents of which are incorporated herein by reference.

TECHNICAL FIELD

The subject matter described herein relates to communication and sensing situational awareness data, and more particularly to a system for sensing and communicating situational awareness data with a distributed antenna system.

BACKGROUND

Many buildings today include systems that enhance wireless communications within the building. These systems could be radio frequency (RF) repeater-type systems, Distributed Antenna Systems (DAS), small cells and other solutions. The types of wireless signals that may be enhanced using these types of systems include cellular systems, Wi-Fi systems and Public Safety systems. In particular, Public Safety systems are being deployed more frequently as fire code requirements become increasingly more stringent.

In addition to enhancement systems for wireless communications, there is also rapid growth in so-called smart buildings. A smart building is any structure that uses automated processes to automatically control the building's operations including heating, ventilation, air conditioning, lighting, security and other systems. A smart building uses sensors, actuators and microchips, in order to collect data and manage it according to a business' functions and services. This infrastructure helps owners, operators and facility managers improve asset reliability and performance, which reduces energy use, optimizes how space is used and minimizes the environmental impact of buildings.

This level of automation coupled with the requirements for wireless enhancement systems leads to extremely complex in-building systems to connect all of the devices together. Various techniques have been considered to minimize this complexity including, wireless mesh networking techniques such as ZigBee and Bluetooth Low Energy (BLE), as well as wired techniques such as Power Line Communications (PLC). However, systems to reduce the complexity of building automation and systems improving RF signal quality in a building have typically not been integrated.

SUMMARY

This document presents a communication and sensing system and method that allows for effective determination of environmental conditions, for example, within a building, and for effective communication of information related to incident response, at least partly based on the environmental conditions. The environmental conditions are determined based on sensor data communicated by the system, as sensed by a number of environmental sensors. These systems and methods reduce the complexity of smart building systems, among other features.

One inventive aspect is a system for communicating between a building and a first responder. The system includes a plurality of sensors, each configured to sense an aspect or condition of an environment of the building, and to transmit a sense signal representing the sensed aspect or condition. The system also includes one or more repeaters, configured to receive the sense signals from the sensors and to transmit repeated sense signals representing the sensed aspects or conditions. The system also includes a processor, configured to receive the repeated sense signals and to transmit an output signal based at least in part on one or more of the repeated sense signals, and one or more output devices configured to receive the output signal and to communicate information associated with the sensed aspect or condition based on the output signal.

In some embodiments, one or more of the sensors is integrated into a housing with one or more of the repeaters.

In some embodiments, one or more of the sensors is integrated into a housing with one or more of the output devices.

In some embodiments, one or more of the repeaters is integrated into a housing with one or more of the output devices.

In some embodiments, one or more of the sensors is fixed at a location within the building.

In some embodiments, one or more of the sensors is movable within the building.

In some embodiments, one or more of the sensors is configured for being attached to the first responder.

In some embodiments, one or more of the sensors is configured to sense an environmental aspect or condition.

In some embodiments, one or more of the sensors is configured to sense one or more of temperature, humidity, pressure, air velocity, smoke, smoke density, oxygen concentration, carbon monoxide concentration, ozone concentration, other chemical concentrations, existence of other chemicals, movement, acceleration, sound, a predetermined sound, a human voice, existence of minimum sound volume, light, particular wavelengths of light, UV radiation, IR radiation, and a change or a minimum change in a particular aspect or condition of the environment.

In some embodiments, one or more of the output devices are configured to communicate the information to the first responder.

In some embodiments, the at least one repeater is further configured to receive the output signal from the processor and to transmit a repeated output signal.

In some embodiments, at least one of the output devices is configured to receive the repeated output signal and to communicate information based on the repeated output signal.

In some embodiments, the at least one output device is configured to communicate the information to at least one of the first responder and another first responder.

In some embodiments, one or more of the output devices are configured to communicate the information to an incident response command personnel individual.

Another inventive aspect is a method of communicating between a building and a first responder. The method includes, with a plurality of sensors, sensing an aspect or condition, with the sensors, transmitting a sense signal representing at least one of the sensed aspects or conditions, and, with one or more repeaters, receiving the sense signal. The method also includes, with the one or more repeaters, transmitting a repeated sense signal representing the sensed aspect or condition, with a processor, receiving the repeated sense signal, and with the processor, transmitting an output signal based at least in part on the repeated sense signal. The method also includes, with one or more output devices, receiving the output signal, and, with the one or more output devices, communicating information based on the received output signal.

In some embodiments, one or more of the sensors is integrated into a housing with one or more of the repeaters.

In some embodiments, one or more of the sensors is integrated into a housing with one or more of the output devices.

In some embodiments, one or more of the repeaters is integrated into a housing with one or more of the output devices.

In some embodiments, one or more of the sensors is fixed at a location within the building.

In some embodiments, one or more of the sensors is movable within the building.

In some embodiments, one or more of the sensors is attached to the first responder.

In some embodiments, the method also includes, with the sensors, sensing an environmental aspect or condition of the building.

In some embodiments, the method also includes, with the sensors, sensing an aspect or condition of the first responder.

In some embodiments, the method also includes, with one or more of the output devices communicating the information to at least one of the first responder and another first responder.

In some embodiments, the method also includes, with one or more of the output devices communicating the information to an incident response command personnel individual.

In some embodiments, the method also includes, with at least one of the repeaters, receiving the output signal from the processor, and with at least one of the repeaters, transmitting a repeated output signal.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIGS. 7-11 are swimming lane diagrams schematically illustrating methods of communicating.

When practical, similar reference numbers denote similar structures, features, or elements.

DETAILED DESCRIPTION

Figure 1:
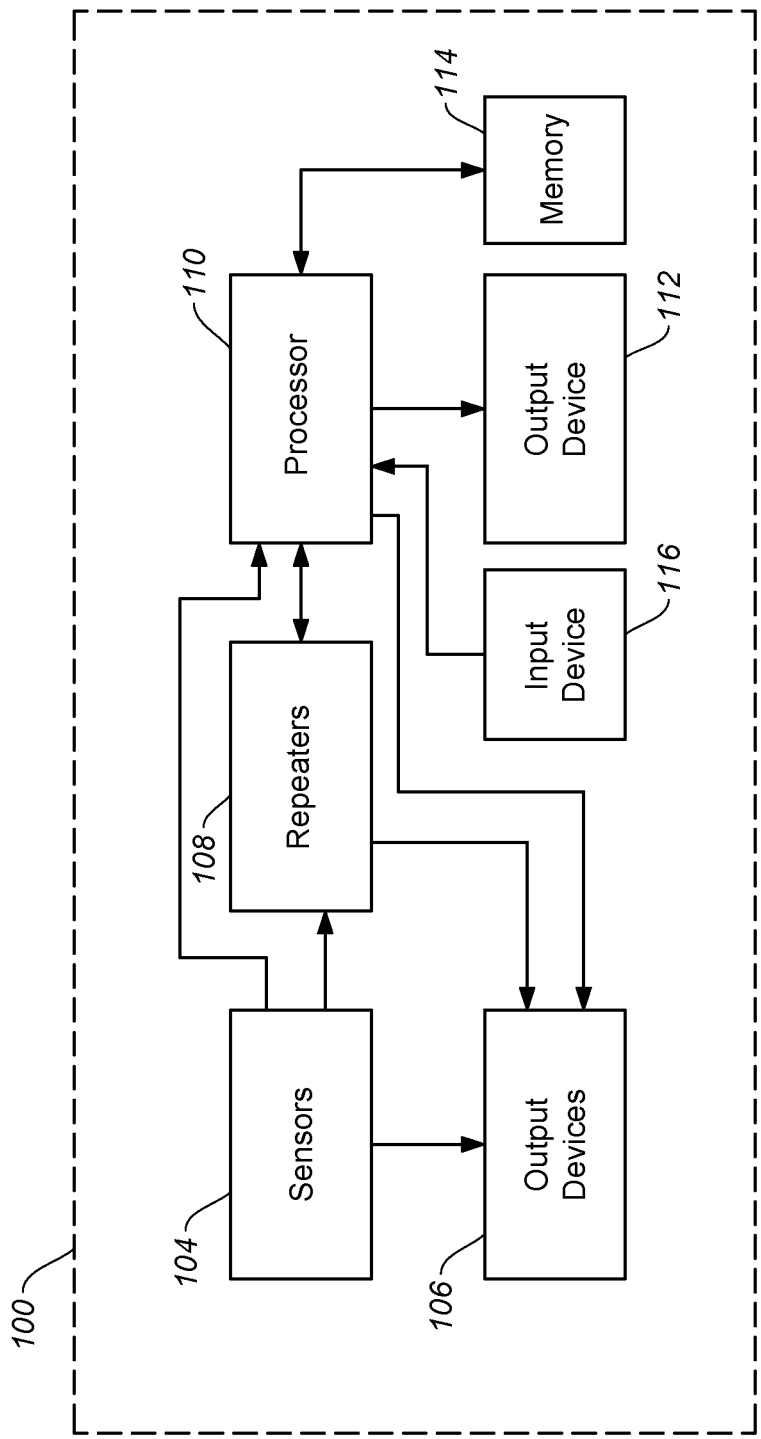
FIG. 1 shows a system consistent with implementations of the current subject matter.

A system 100 according to some embodiments is schematically illustrated in FIG. 1. The system 100 includes one or more sensors 104, one or more output devices 106, one or more repeaters 108, one or more processors 110, one or more input devices 116, output device 112, and memory 114. System 100 is configured to facilitate communication of information to output devices 106, to output device 112, and to and from processor 110 and memory 114.

System 100 may be used, for example, by teams of first responders, such as firefighters, EMTs, paramedics, and police, for example, to coordinate incident response team efforts.

Each of sensors 104 is configured to sense local environment information or conditions, and to generate electrical sense signals representing the local environment information or conditions. Sensors 104 can include an ADC or a codec for at least encoding the electrical sense signals. Sensors 104 are also configured to transmit the electrical sense signals to at least one of the processor 110, and one or more of output devices 106.

For example, sensors 104 may be situated within a building so as to generate electrical sense signals representing current local environment information or conditions existing within the building. In addition, output devices 106 may also be situated within the building, and may be configured to generate output signals which may be received by first responders, for example, within the building or outside of the building within a geographical region.

One or more of sensors 104 may be in fixed locations within the building. For example, prior to a first responder or emergency incident, the sensors 104 may be placed within the building. The locations within the building the sensors 104 may be placed may be fixed. For example, the sensors 104 may be mounted to a wall, a floor, a ceiling, or another structure permanently, semi-permanently, or temporarily attached to the building. Alternatively, the sensors 104 may be movable.

In some embodiments, one or more of the sensors 104 is mobile. For example, one or more of the sensors 104 may be remotely moved or relocated, for example from the incident command center, for example, using a wireless network, such as a mobile cell phone network. Signals for the remote controlling of the one or more mobile sensors may be communicated from the incident command center using the communication components of system 100.

One or more of sensors 104 may be attached to first responders. For example, one or more of sensors 104 may be attached to or held by clothing worn by the first responders. Alternatively, one or more of sensors 104 may be carried, for example, as equipment by the first responders. The one or more sensors 104 attached to first responders are not limited with regard to how they are attached to the first responders.

In some embodiments, one or more of sensors 104 is integrated into the same package or housing or component as one or more of repeaters 108, for example, as discussed below with reference to FIG. 3. Additionally or alternatively, in some embodiments, one or more of sensors 104 is integrated into the same package or housing or component as one or more of output devices 106, for example, as discussed below with reference to FIG. 4. Additionally or alternatively, in some embodiments, one or more of sensors 104 is integrated into the same package or housing or component as one or more of repeaters 108 and one or more of output devices 106, for example, as discussed below with reference to FIG. 5. Additionally or alternatively, in some embodiments, one or more of repeaters 108 is integrated into the same package or housing or component as one or more of output devices 106, for example, as discussed below with reference to FIG. 6.

Processor 110 is configured to receive electrical signals representing information from sensors 104 and to receive command signals from input device 116. In addition, processor 110 is configured to process the electrical signals, the command signals, and other data, and to generate signals for one or more of memory 114, output device 112, and one or more of the output devices 106.

Processor 110, output device 112, memory 114, and input device 116 may be situated outside of the building, for example at an incident response command location. In some embodiments, the incident response command is located on site and outside of the building. Alternatively, the incident response command may be located remotely, for example, within another building. In some embodiments, the incident response command has other physical location arrangements. For example, in some embodiments, the incident response command is distributed among a number of locations. The physical location arrangement of the incident response command is not limited by this disclosure.

In some embodiments, processor 110 generates signals for output device 112 which cause output device 112 to communicate information using, for example, one or more displays, and/or one or more speakers, and/or one or more lights, and/or one or more buzzers, and/or one or more lights, and/or one or more buzzers, and/or one or more other output devices, where the communicated information represents the local environment information sensed by sensors 104. Using the communicated information, command personnel at the incident response command location are able to perceive the sensed local environment information, in addition to other incident related information.

In addition, processor 110 may be configured to receive signals from input device 116 which are generated by input device 116 in response to inputs received from command personnel at the incident response command location. Accordingly, the command personnel are able to input information for processor 110. Based on the information from the command personnel, processor 110 may be configured to generate signals for any or all of output device 112, memory 114, and one or more of output devices 106.

Processor 110 may also be configured to cause information to be stored in memory 114 corresponding, for example, with any or all of the signals processor 110 receives from one or more of sensors 104, and input device 116, memory 114, or is generated by processor 110, for example, in response to the signals processor 110 receives from sensors 104 and input device 116. Processor 110 may additionally be configured to retrieve any of the information stored in memory 114.

Furthermore, processor 110 may be configured to generate signals for one or more of output devices 106, for example, in response to processed information received from any of the command personnel, sensors 104, and memory 114. Accordingly, the command personnel are able to input information for processor 110, and, in response to the information from the command personnel, processor 110 may generate signals for one or more of output devices 106.

The generated signals are communicated to the one or more output devices 106, and cause the one or more output devices 106 to communicate information using, for example, one or more displays, and/or one or more speakers, and/or one or more lights, and/or one or more buzzers, and/or one or more other output devices, where the communicated information represents the information processed by processor 110. The information may be communicated, for example, as an alarm, a graphic display, an audio command or message, or another form. Using the communicated information, first responders and/or other individuals, for example, within the building, are able to perceive the processed information.

In preferred exemplary implementations, repeaters 108 may be configured to receive signals from the sensors 104 and transmit the received signals to either or both of processor 110 and one or more output devices 106. Repeaters 108 may additionally be configured to receive signals from processor 110 and transmit the received signals to the output devices 106.

Accordingly, signals may be transmitted from sensors 104 to processor 110 via one or more of repeaters 108. Alternatively, signals may be transmitted directly from sensors 104 to processor 110, for example, using a direct wired or wireless communication channel.

Similarly, signals may be transmitted from sensors 104 to one or more output devices 106 via one or more of repeaters 108. Alternatively, signals may be transmitted directly from sensors 104 to one or more output devices 106, for example, using a direct wired or wireless communication channel.

In addition, signals may be transmitted from processor 110 to one or more of output devices 106 via one or more of repeaters 108. Alternatively, signals may be transmitted directly from processor 110 to one or more of output devices 106, for example, using a direct wired or wireless communication channel.

In some implementations, the communication medium of the system 100 is at least partly wireless, for example, using techniques such as an RF mesh network such as ZigBee or Bluetooth Low Energy (BLE). In some implementations, the communication medium of the system 100 is at least partly wired, for example, using techniques such as Power Line Communications (PLC).

Figure 2:
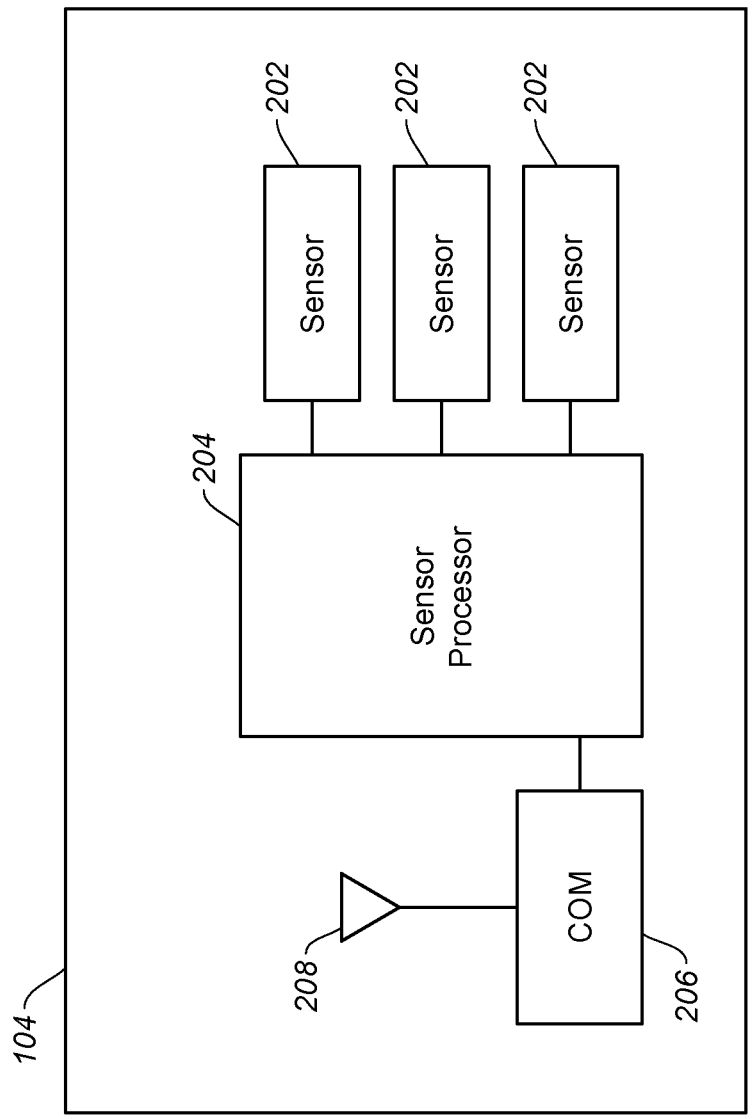
FIG. 2 shows a first embodiment of a sensor of a distributed system, consistent with implementations of the current subject matter.

FIG. 2 illustrates a schematic view of a first embodiment of a sensor 104 of a distributed system, consistent with implementations of the current subject matter. Instantiations of sensor 104 of FIG. 2 may be used as any or all of the one or more sensors 104 in the system 100 of FIG. 1. Sensor 104 includes sensor elements 202, sensor processor 204, communications module 206, and transmit antenna 208.

Each of sensor elements 202 is configured to sense one or more aspects or conditions of the environment. For example, each of sensor elements 200 to may be configured to sense one or more of temperature, humidity, pressure, air velocity, smoke, smoke density, oxygen concentration, carbon monoxide concentration, ozone concentration, other chemical concentrations, existence of other chemicals, movement, acceleration, sound (including particular sounds such as a human voice), existence of minimum sound volume, light, particular wavelengths of light, UV radiation, IR radiation, and a change or a minimum change in a particular aspect or condition of the environment. In some embodiments, one or more of sensor elements 202 are configured to additionally sense one or more other aspects or conditions of the environment. In some embodiments, one or more of sensor elements 202 are configured to sense whether the sensed aspect or condition is greater than or less than a particular threshold value associated with the sensed aspect or condition.

In some embodiments, multiple sensor elements 202 that are configured to sense one or more of the same environmental aspects or conditions are included in the same sensor 104.

Each of sensor elements 202 in sensors 104 that are attached to a first responder is configured to sense one or more aspects or conditions of the environment. For example, each of sensor elements 202 in sensors 104 attached to a first responder may be configured to sense one or more of temperature, humidity, pressure, air velocity, smoke, smoke density, oxygen concentration, other chemical concentrations, existence of other chemicals, movement, acceleration, sound, particular sounds, existence of minimum sound volume, light, particular wavelengths of light, UV radiation, IR radiation, and a change or a minimum change in a particular aspect or condition of the environment. In addition, each of the sensor elements 202 in sensors 104 that are attached to a first responder may be configured to sense one or more aspects or conditions of the first responder to which it is attached.

For example, each of the sensor elements 202 in sensors 104 that are attached to a first responder may be configured to sense one or more of a body temperature, a heart rate, a blood pressure, a blood oxygen level, a blood carbon dioxide level, a blood carbon monoxide level, a skin conductivity, pupil dilation diameter, another physiological condition of the first responder, movement, acceleration, voice, and a change or a minimum change in a particular aspect or condition of the first responder. In some embodiments, the one or more aspects or conditions of the first responder the sensor elements 202 are configured to sense includes one or more of a button pushed by the first responder, a verbal utterance from the first responder, or another action by the first responder, such as predefined hand-wave or gesture, or display of an object representing an emergency situation, for example. In some embodiments, one or more of sensor elements 202 in sensors 104 that are attached to a first responder are configured to sense one or more other aspects or conditions of the first responder. In some embodiments, one or more of sensor elements 202 are configured to sense whether the sensed aspect or condition is greater than or less than a particular threshold value associated with the sensed aspect or condition.

In some embodiments, sensors 104 attached to a first responder include multiple sensor elements 202 configured to sense one or more of the same aspects or conditions.

Sensor elements 202 are also configured to generate electronic signals which encode a representation of the sensed aspect or condition. In addition, sensor elements 202 are configured to transmit the electronic signals to sensor processor 204.

Each particular sensor element 202 comprises sensor structures, features, and capabilities known by those of skill in the art which cause the particular sensor element 202 to sense one or more particular environment or first responder aspects or conditions, and to generate an electronic signal representing the aspects or conditions. Accordingly, numerous examples of sensor elements are known to those of ordinary skill in the art, and can be used for sensor elements 202. In some embodiments, however, one or more of sensor elements 202 includes a sensor element which is not known to those of ordinary skill in the art.

Sensor processor 204 is configured to receive the electronic signals from sensor elements 202, and to generate sensor data for a signal to be transmitted based on the received electronic signals. The generated sensor data encodes a representation of the aspects or conditions sensed by one or more of sensor elements 202, and which is represented by the electronic signals received from sensor elements 202.

Sensor processor 204 comprises sensor processor structures, features, and capabilities known by those of skill in the art which cause the sensor processor 204 to receive the electronic signals from sensor elements 202, and to generate the sensor data. Accordingly, numerous examples of sensor processors 204 are known to those of ordinary skill in the art, and can be used for the sensor processor 204. In some embodiments, sensor processor comprises one or more analog to digital converters (ADC) configured to receive the electronic signals form sensor elements 202, and to generate digital signals representing the sensor data. In some embodiments, however, sensor processor 204 includes a sensor processor which is not known to those of ordinary skill in the art.

The number of sensor elements 202 and the conditions or aspects which they each sense is not limited by this disclosure.

Communications module 206 is configured to receive the sensor data generated by sensor processor 204, and to drive transmit antenna 208 with a transmit signal generated based on the received sensor data. The generated transmit signal encodes a representation of the aspects or conditions sensed by one or more of sensor elements 202, and which is represented by the sensor data generated by sensor processor 204.

Communications module 206 may comprise structures, features, and capabilities known by those of skill in the art which cause the communications module 206 to receive the sensor data generated by sensor processor 204, and to generate the transmit signal for transmit antenna 208. For example, communications module 206 may include one or more of a local oscillator circuit, a mixer, and a power amplifier known to those of ordinary skill in the art. In some embodiments, however, communications module 206 includes a communications module having structures, features, and capabilities which are not known to those of ordinary skill in the art. For example, communications module 206 may include one or more of a local oscillator circuit, a mixer, and a power amplifier not known to those of ordinary skill in the art.

Transmit antenna 208 is configured to receive the transmit signal generated by communications module 206, and is configured to generate a radio frequency (RF) signal based on the received transmit signal. The RF signal encodes a representation of the aspect or condition sensed by one or more of sensor elements 202, and which is represented by the transmit signal generated by communications module 206.

Transmit antenna 208 comprises structures, features, and capabilities known by those of skill in the art which cause the transmit antenna 208 to receive the transmit signal generated by communications module 206, and to generate the RF signal. In some embodiments, however, transmit antenna 208 includes an antenna having one or more structures, features, and capabilities which are not known to those of ordinary skill in the art.

Figure 3:
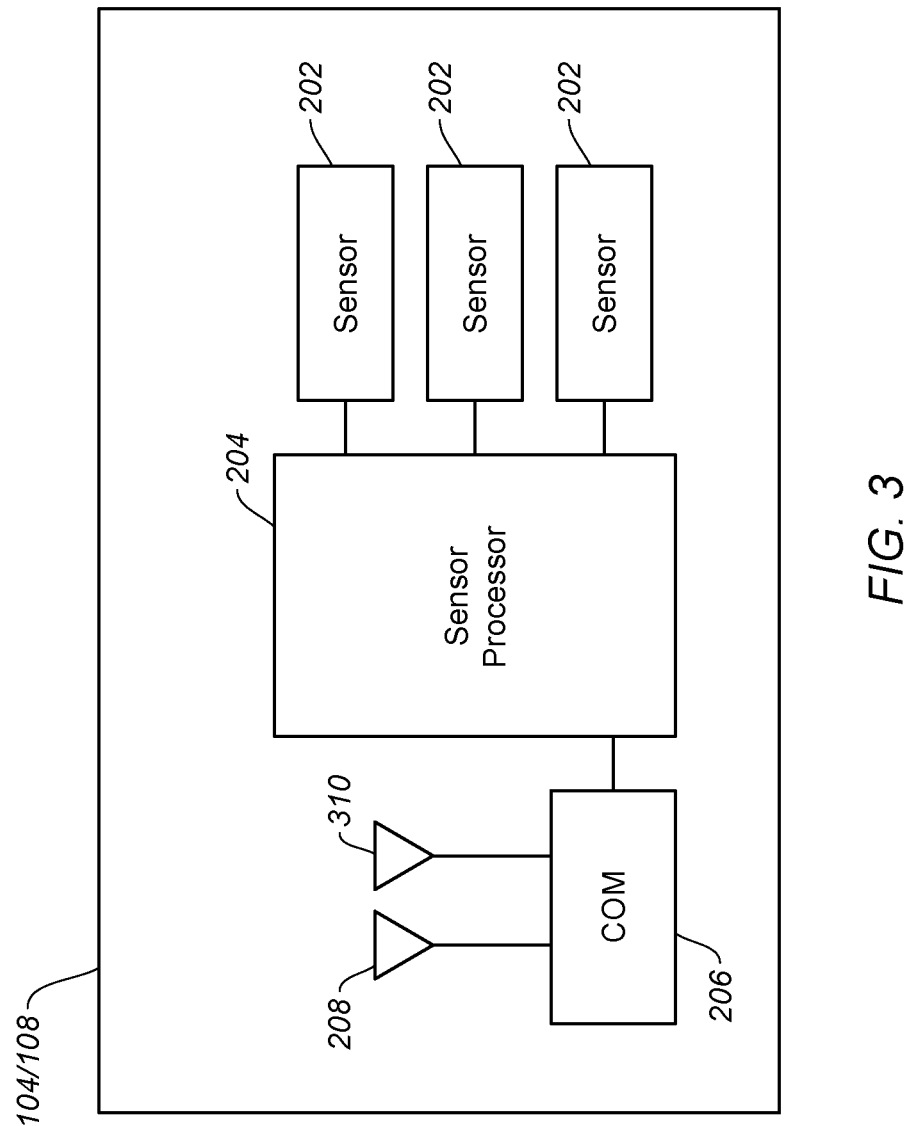
FIG. 3 shows a second embodiment of a sensor of a distributed system, consistent with implementations of the current subject matter.

FIG. 3 illustrates a schematic view of a second embodiment of a sensor (or sensor/repeater) 104/108 of a distributed system, consistent with implementations of the current subject matter. Instantiations of sensor 104/108 of FIG. 3 may be used as any or all of the one or more sensors 104 in the system 100 of FIG. 1. Sensor 104/108 also has the features of the one or more repeaters 108 of FIG. 1, and instantiations thereof may be additionally used as any or all of the one or more repeaters 108 in the system 100 of FIG. 1. Sensor 104/108 includes sensor elements 202, sensor processor 204, communications module 206, transmit antenna 208, and receive antenna 310.

Sensor elements 202 may have features, structure, and capabilities similar or identical to sensor element 202 discussed with reference to FIG. 2. In addition, sensor processor 204 may have features, structure, and capabilities similar or identical to sensor processor 204 discussed with reference to FIG. 2. Furthermore, communications module 206 may have features, structure, and capabilities similar or identical to communications module 206 discussed with reference to FIG. 2. Similarly, transmit antenna 208 may have features, structure, and capabilities similar or identical to transmit antenna 208 discussed with reference to FIG. 2.

Receive antenna 310 is configured to receive RF signals transmitted, for example, by transmit antennas 208 located remotely from sensor 104/108. Receive antenna 310 is also configured to provide the received RF signals to communications module 206. In some embodiments, the RF signals include data representing a representation of one or more aspects or conditions sensed by a sensor remote from sensor 104/108.

Communications module 206 is configured to receive the RF signals from receive antenna 310, and to drive transmit antenna 208 with a transmit signal generated based on the received RF signals. The generated transmit signal may encode a representation of the aspects or conditions sensed by the remote sensor.

Communications module 206 may additionally comprise structures, features, and capabilities known by those of skill in the art which cause the communications module 206 to receive the RF signal from receive antenna 310, and to generate the transmit signal for transmit antenna 208. For example, communications module 206 may include one or more of a filter, a low noise amplifier, a local oscillator circuit, a mixer, a variable gain amplifier, and an ADC known to those of ordinary skill in the art. In some embodiments, however, communications module 206 includes a communications module having structures, features, and capabilities which are not known to those of ordinary skill in the art. For example, communications module 206 may include one or more of a filter, a low noise amplifier, a local oscillator circuit, a mixer, a variable gain amplifier, and an ADC having one or more structures, features, and capabilities not known to those of ordinary skill in the art.

In the illustrated embodiment, receive antenna 310, communications module 206, and transmit antenna 208 cooperatively form at least a portion of a repeater circuit configured to rebroadcast data received by receive antenna 310 and which is additionally configured to broadcast data received from sensor processor 204. In alternative embodiments, alternative circuits or circuit topologies may be used to rebroadcast data received by receive antenna 310 and to broadcast data received from sensor processor 204.

Figure 4:
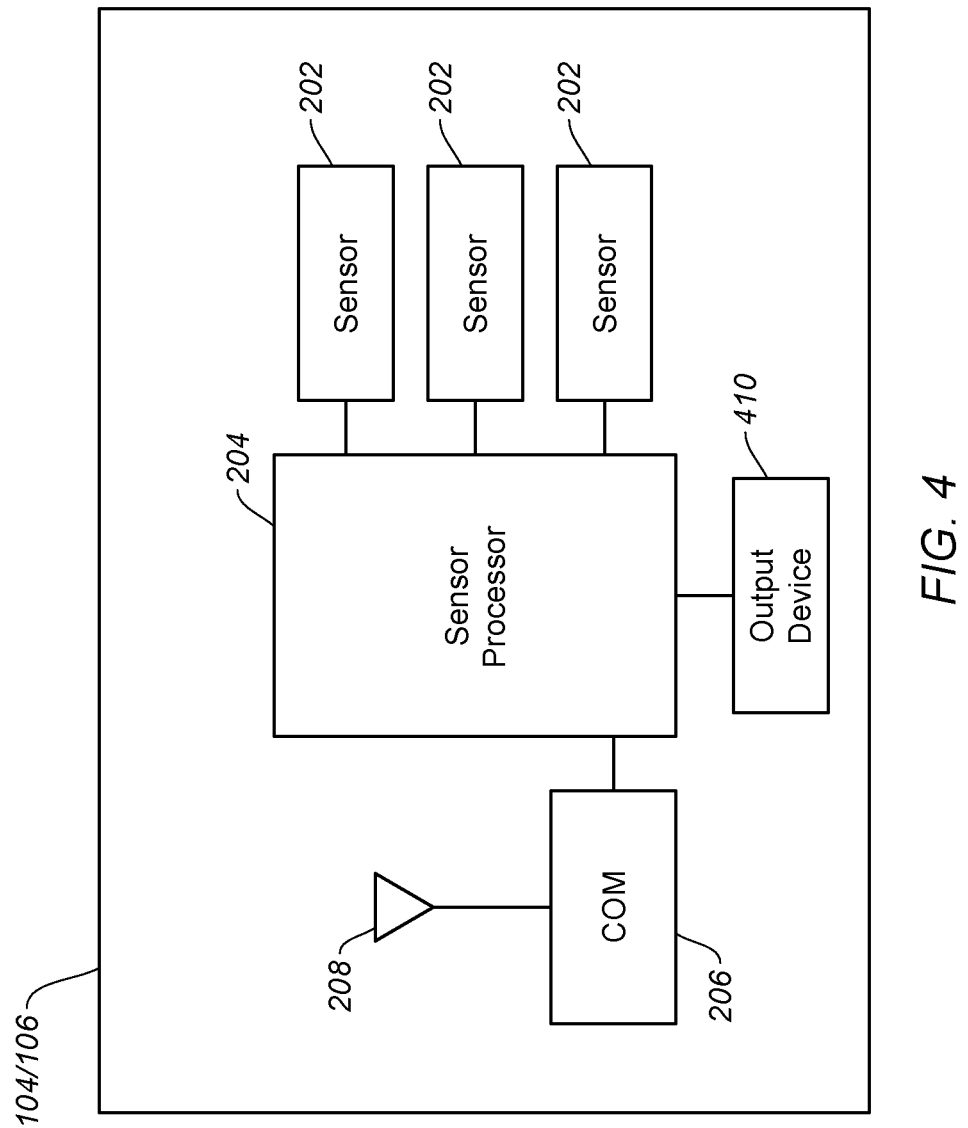
FIG. 4 shows a third embodiment of a sensor of a distributed system, consistent with implementations of the current subject matter.

FIG. 4 illustrates a schematic view of a third embodiment of a sensor (or sensor/output device) 104/106 of a distributed system, consistent with implementations of the current subject matter. Instantiations of sensor 104/106 of FIG. 4 may be used as any or all of the one or more sensors 104 in the system 100 of FIG. 1. Sensor 104/106 also has the features of the one or more output devices 106 of FIG. 1, and instantiations thereof may be additionally used as any or all of the one or more output devices 106 in the system 100 of FIG. 1. Sensor 104/106 includes sensor elements 202, sensor processor 204, communications module 206, transmit antenna 208, and output device 410.

Sensor elements 202 may have features, structure, and capabilities similar or identical to sensor element 202 discussed with reference to FIG. 2. In addition, sensor processor 204 may have features, structure, and capabilities similar or identical to sensor processor 204 discussed with reference to FIG. 2. Furthermore, communications module 206 may have features, structure, and capabilities similar or identical to communications module 206 discussed with reference to FIG. 2. Similarly, transmit antenna 208 may have features, structure, and capabilities similar or identical to transmit antenna 208 discussed with reference to FIG. 2. In addition, output device 410 may have features, structure, and capabilities similar or identical to output device 106 discussed with reference to FIG. 1.

Sensor processor 204 may be additionally configured to generate output data for output device 410 based on the electronic signals received from sensor elements 202. Sensor processor 204 may be configured to process the electronic signals received from sensor element 202 to determine whether output data is to be generated.

For example, the generated output data may be generated in response to the sensor processor 204 determining that the electronic signals received from sensor element 202 indicates that a sensed aspect or condition exceeds a maximum threshold value for the sensed aspect or condition or is less than a minimum threshold value for the sensed aspect or condition. Additionally or alternatively, the generated output data may be generated in response to the sensor processor 204 determining that a change has occurred in a sensed aspect or condition. Additionally or alternatively, the generated output data may be generated in response to the sensor processor 204 determining that a predetermined amount of time has passed since corresponding output data has been generated. Alternative triggers in response to which the sensor processor 204 generates output data may be used, and are not limited by this disclosure.

Sensor processor 204 comprises sensor processor structures, features, and capabilities known by those of skill in the art which cause the sensor processor 204 to receive the electronic signals from sensor elements 202, and to generate the output data. Accordingly, numerous examples of sensor processors 204 are known to those of ordinary skill in the art, and can be used for the sensor processor 204. In some embodiments, however, sensor processor 204 includes a sensor processor which is not known to those of ordinary skill in the art.

Output device 410 is configured to receive the output data from sensor processor 204, and to communicate information represented by the output data using, for example, one or more displays, and/or one or more speakers, and/or one or more lights, and/or one or more buzzers, and/or one or more other output devices, where the communicated information is based on or communicates the information of the output data.

Figure 5:
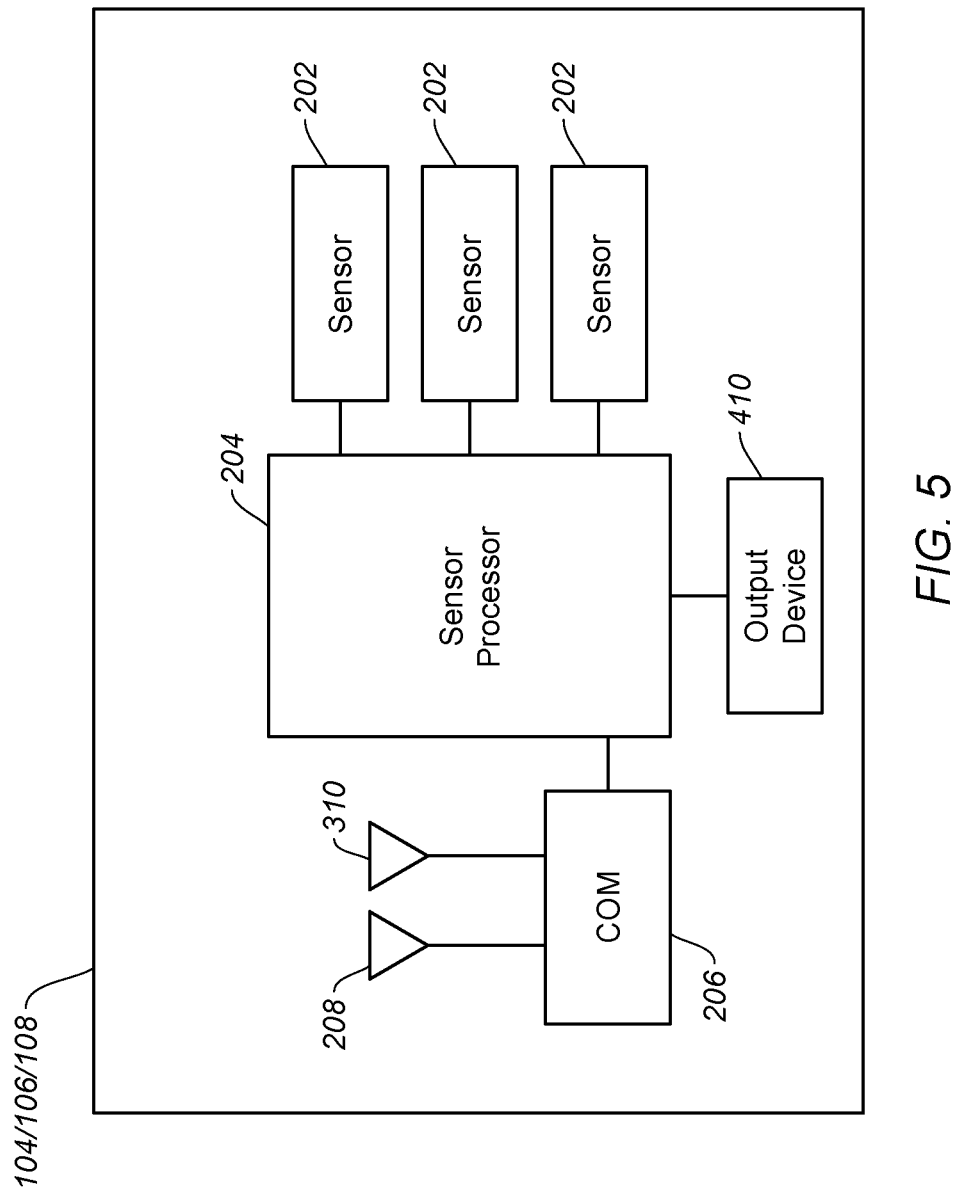
FIG. 5 shows a fourth embodiment of a sensor of a distributed system, consistent with implementations of the current subject matter.

FIG. 5 illustrates a schematic view of a fourth embodiment of a sensor (or sensor/output device/repeater) 104/106/108 of a distributed system, consistent with implementations of the current subject matter. Instantiations of sensor 104/106/108 of FIG. 5 may be used as any or all of the one or more sensors 104 in the system 100 of FIG. 1. Sensor 104/106/108 of FIG. 5 also has the features of the one or more output devices 106 of FIG. 1, and instantiations thereof may be additionally used as any or all of the one or more output devices 106 in the system 100 of FIG. 1. Sensor 104/106/108 of FIG. 5 also has the features of the one or more repeaters 108 of FIG. 1, and instantiations thereof may be additionally used as any or all of the one or more repeaters 108 in the system 100 of FIG. 1. Sensor 104/106/108 includes sensor elements 202, sensor processor 204, communications module 206, transmit antenna 208, receive antenna 310, and output device 410.

Sensor elements 202 may have features, structure, and capabilities similar or identical to sensor element 202 discussed with reference to FIG. 2. In addition, sensor processor 204 may have features, structure, and capabilities similar or identical to sensor processor 204 discussed with reference to FIG. 2. Furthermore, communications module 206 may have features, structure, and capabilities similar or identical to communications module 206 discussed with reference to FIG. 2. Similarly, transmit antenna 208 may have features, structure, and capabilities similar or identical to transmit antenna 208 discussed with reference to FIG. 2. In addition, output device 410 may have features, structure, and capabilities similar or identical to output device 106 discussed with reference to FIG. 1. Furthermore, receive antenna 310 may have features, structure, and capabilities similar or identical to receive antenna 310 discussed with reference to FIG. 3.

Figure 6:
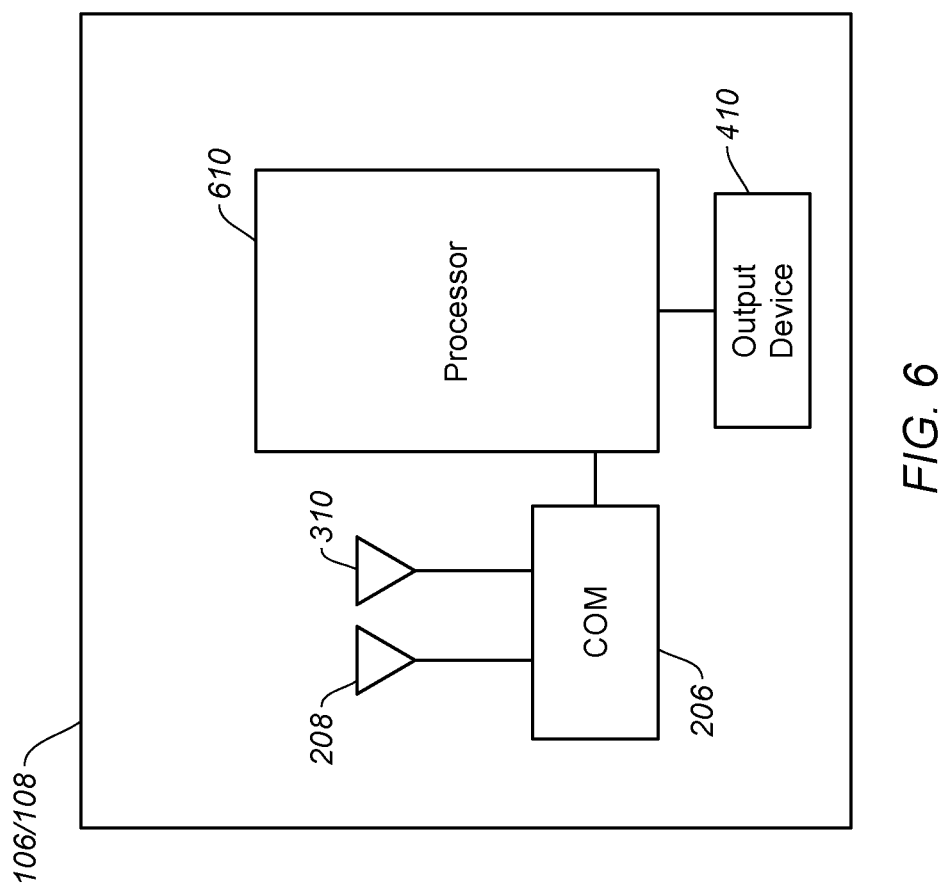
FIG. 6 shows an embodiment of a repeater/output device of a distributed system, consistent with implementations of the current subject matter.

FIG. 6 shows an embodiment of a repeater/output device 104/106 of a distributed system, consistent with implementations of the current subject matter. Repeater/output device 104/106 of FIG. 6 has the features of the one or more output devices 106 of FIG. 1, and instantiations thereof may be additionally used as any or all of the one or more output devices 106 in the system 100 of FIG. 1. Repeater/output device 104/106 of FIG. 6 also has the features of the one or more repeaters 108 of FIG. 1, and instantiations thereof may be additionally used as any or all of the one or more repeaters 108 in the system 100 of FIG. 1. Repeater/output device 104/106 includes processor 610, communications module 206, transmit antenna 208, receive antenna 310, and output device 410.

Communications module 206 may have features, structure, and capabilities similar or identical to communications module 206 discussed with reference to FIG. 2. Similarly, transmit antenna 208 may have features, structure, and capabilities similar or identical to transmit antenna 208 discussed with reference to FIG. 2. In addition, output device 410 may have features, structure, and capabilities similar or identical to output device 106 discussed with reference to FIG. 1. Furthermore, receive antenna 310 may have features, structure, and capabilities similar or identical to receive antenna 310 discussed with reference to FIG. 3.

Communications module 206 is also configured to receive the RF signals from receive antenna 310, and to provide a signal to processor 610 generated based on the received RF signals. The provided signal may encode a representation of the aspects or conditions sensed by a remote sensor.

Communications module 206 may comprise structures, features, and capabilities known by those of skill in the art which cause the communications module 206 to receive the RF signal from receive antenna 310, and to generate the signal provided to processor 610. For example, communications module 206 may include one or more of a filter, a low noise amplifier, a local oscillator circuit, a mixer, a variable gain amplifier, and an ADC known to those of ordinary skill in the art. In some embodiments, however, communications module 206 includes a communications module having structures, features, and capabilities which are not known to those of ordinary skill in the art.

In the illustrated embodiment, receive antenna 310, communications module 206, and transmit antenna 208 cooperatively form at least a portion of a repeater circuit configured to rebroadcast data received by receive antenna 310 and which is additionally configured to generate the signal provided to processor 610. In alternative embodiments, alternative circuits or circuit topologies may be used to rebroadcast data received by receive antenna 310 and to generate the signal provided to processor 610.

Processor 610 may be configured to generate output data for output device 410 based on the signals received from communications module 206. Processor 610 may be configured to process the electronic signals received from communications module 206 to determine whether output data is to be generated.

For example, the generated output data may be generated in response to the processor 610 determining that the signals received from communications module 206 indicate that a sensed aspect or condition exceeds a maximum threshold value for the sensed aspect or condition or is less than a minimum threshold value for the sensed aspect or condition. Additionally or alternatively, the generated output data may be generated in response to the processor 610 determining that a change has occurred in a sensed aspect or condition. Additionally or alternatively, the generated output data may be generated in response to the processor 610 determining that a predetermined amount of time has passed since corresponding output data has been generated. Alternative triggers in response to which the processor 610 generates output data may be used, and are not limited by this disclosure.

Processor 610 comprises processor structures, features, and capabilities known by those of skill in the art which cause the processor 610 to receive the signals from communications module 206, and to generate the output data. Accordingly, numerous examples of processors are known to those of ordinary skill in the art, and can be used for the processor 610. In some embodiments, however, processor 610 includes a processor which is not known to those of ordinary skill in the art.

Output device 410 is configured to receive the output data from processor 610, and to communicate information represented by the output data using, for example, one or more displays, and/or one or more speakers, and/or one or more lights, and/or one or more buzzers, and/or one or more other output devices, where the communicated information is based on or communicates the information of the output data.

FIGS. 7-11 are swimming lane diagrams schematically illustrating certain methods of communicating, for example, using the system 100 of FIG. 1 having, for example, one or more of the components illustrated in FIGS. 2-6. The illustrated methods may be performed using other systems. In some embodiments, the system may simultaneously or substantially simultaneously perform multiple instances of the same method. Additionally or alternatively, in some embodiments, the system may simultaneously or substantially simultaneously perform more than one of the methods. The illustrated methods may be performed, for example, during a response to an emergency incident. For example, illustrated methods may be performed during a response to a fire or another emergency associated with a building.

In some embodiments, the system performs other methods not specifically described. For example, the actors of the illustrated methods or other actors may perform any of the actions described herein as part of the illustrated methods or as part of other methods not specifically described.

The actors of the illustrated methods include one or more first responders 711, one or more output devices 721, one or more sensors 731, one or more repeaters 741, one or more processors 751, one or more output devices 761, one or more input devices 771, and one or more command personnel individuals 781.

Output devices 721 may have features, structure, and capabilities similar or identical to output devices or output device components discussed with reference to any or all of FIGS. 1, 4, 5, and 6. Sensors 731 may have features, structure, and capabilities similar or identical to the sensors or sensor components discussed with reference to any or all of FIGS. 1-6. Repeaters 741 may have features, structure, and capabilities similar or identical to repeaters or repeater components discussed with reference to any or all of FIGS. 1, 3, 5, and 6. Processors 751 may have features, structure, and capabilities similar or identical to processor 110 discussed with reference to FIG. 1. Output devices 761 may have features, structure, and capabilities similar or identical to output devices 112 discussed with reference to FIG. 1. Input devices 771 may have features, structure, and capabilities similar or identical to input device 116 discussed with reference to FIG. 1.

FIG. 7 is a swimming lane diagram schematically illustrating a method 700 of communicating using a first responder system. One or more of the components participating in method 700 is described in the singular. In alternative embodiments, one or more actions or functions may be performed by multiple components of the first responder system.

The method 700 may be performed, for example, to transmit local environment information to an incident response command center or to command personnel at the response command center, or who are within or proximate to a building from which the local environment information is sensed and collected.

At 710 a sensor 731 senses local environment aspects or conditions, and transmit electrical sense signals representing the local environment aspects or conditions, for example, as discussed in more detail elsewhere herein. The electrical sense signals are transmitted to processor 751. In some embodiments, the electrical sense signals are transmitted to processor 751 using one or more repeaters 741.

At 720, processor 751 receives the electrical sense signals transmitted from sensor 731. In addition, processor 751 processes the electrical signals, and generates signals for output device 761, for example, as discussed in more detail elsewhere herein.

At 730, output device 761 receives the signals from processor 751. In addition, output device 761 is caused by the signals received from processor 751 to communicate information representing the local environment information sensed by sensor 731, for example, as discussed in more detail elsewhere herein.

At 740, command personnel 781 at the incident response command location perceive the sensed local environment information because of the information communicated by the output device 761.

FIG. 8 is a swimming lane diagram schematically illustrating a method 800 of communicating using a first responder system. One or more of the components participating in method 800 is described in the singular. In alternative embodiments, one or more actions or functions may be performed by multiple components of the first responder system.

The method 800 may be performed, for example, to transmit information to first responders from an incident response command center or from command personnel at the response command center, or who are within or proximate to a building from which the local environment information is sensed and collected.

At 810, a command personnel individual 781 provides inputs to input device 771, where the inputs represent information for processor 751, for example, as discussed in more detail elsewhere herein.

At 820, the input device receives the inputs from the command personnel individual 781. In addition, the input device 771 generates input signals for processor 751 based on the received inputs, where the input signals communicate the information for the processor 751 represented by the inputs.

At 830, processor 751 receives the input signals from input device 771. Based at least partly on the input signals, the processor 751 generates signals for output device 721, for example, as discussed in more detail elsewhere herein. In addition, the processor 751 transmits the signals to output device 761. In some embodiments, the processor 751 generates the signals at least partly based on other information, such as sensed environment aspect or condition information, and/or other information, for example, as discussed in more detail elsewhere herein.

In some embodiments, the signals are transmitted from processor 751 to output device 761 using one or more repeaters 741, for example, as discussed in more detail elsewhere herein.

At 840, output device 721 receives the signals transmitted from processor 751. In addition, output device 721 is caused by the signals received from processor 751 to communicate information corresponding with the received signals, for example, as discussed in more detail elsewhere herein.

At 850, a first responder 711, for example, in a building, perceives information transmitted from the processor 751 because of the information communicated by output device 721.

Figure 9:
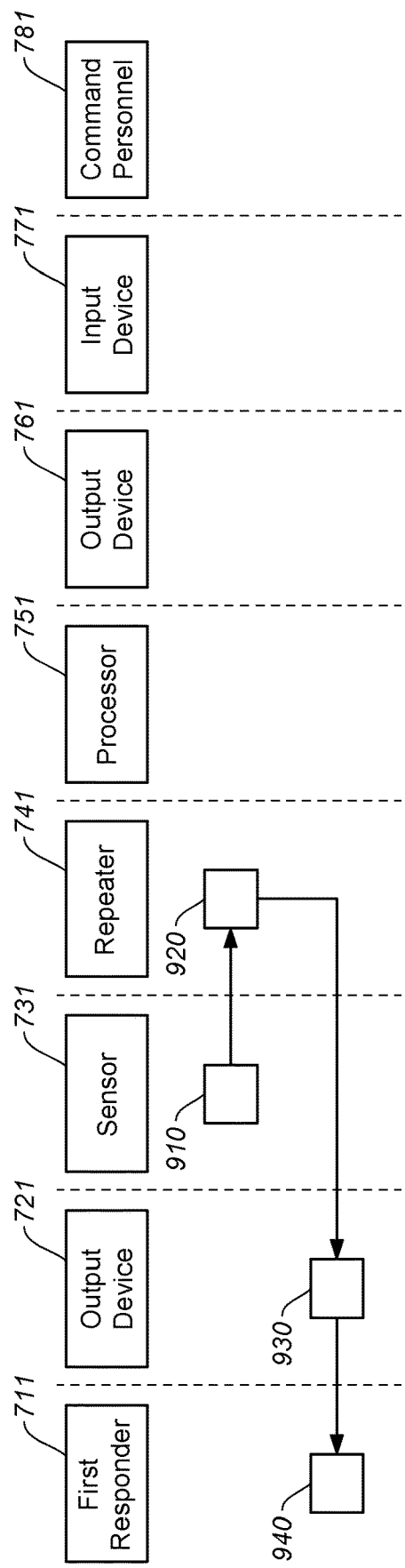

FIG. 9 is a swimming lane diagram schematically illustrating a method 900 of communicating using a first responder system. One or more of the components participating in method 900 is described in the singular. In alternative embodiments, one or more actions or functions may be performed by multiple components of the first responder system.

The method 900 may be performed, for example, to transmit information based on environmental information to first responders. For example, a sensor may provide environment information indicating a situation or emergency, and first responders may receive a message indicating or based on the situation or emergency.

At 910 a sensor 731 senses local environment information or conditions, and transmits electrical sense signals representing the local environment information or conditions, for example, as discussed in more detail elsewhere herein. The electrical sense signals are transmitted to a particular repeater 741. In some embodiments, the electrical sense signals are transmitted to the particular repeater 741 using one or more other repeaters 741.

At 920, particular repeater 741 receives the electrical sense signals from sensor 731. Based at least partly on the electrical sense signals, the repeater generates signals for output device 721, for example, as discussed in more detail elsewhere herein. In addition, the particular repeater 741 transmits the signals to output device 761. In some embodiments, the particular repeater 741 generates the signals at least partly based on other information, such as other sensed environment aspect or condition information, and/or other information, for example, as discussed in more detail elsewhere herein.

In some embodiments, the signals are transmitted from the particular repeater 741 to output device 761 using one or more other repeaters 741, for example, as discussed in more detail elsewhere herein.

At 930, output device 721 receives the signals transmitted from the particular repeater 741. In addition, output device 721 is caused by the signals received from particular repeater 741 to communicate information corresponding with the received signals, for example, as discussed in more detail elsewhere herein.

At 940, a first responder 711, for example, in a building, perceives information transmitted from the processor 751 because of the information communicated by output device 721.

Figure 10:
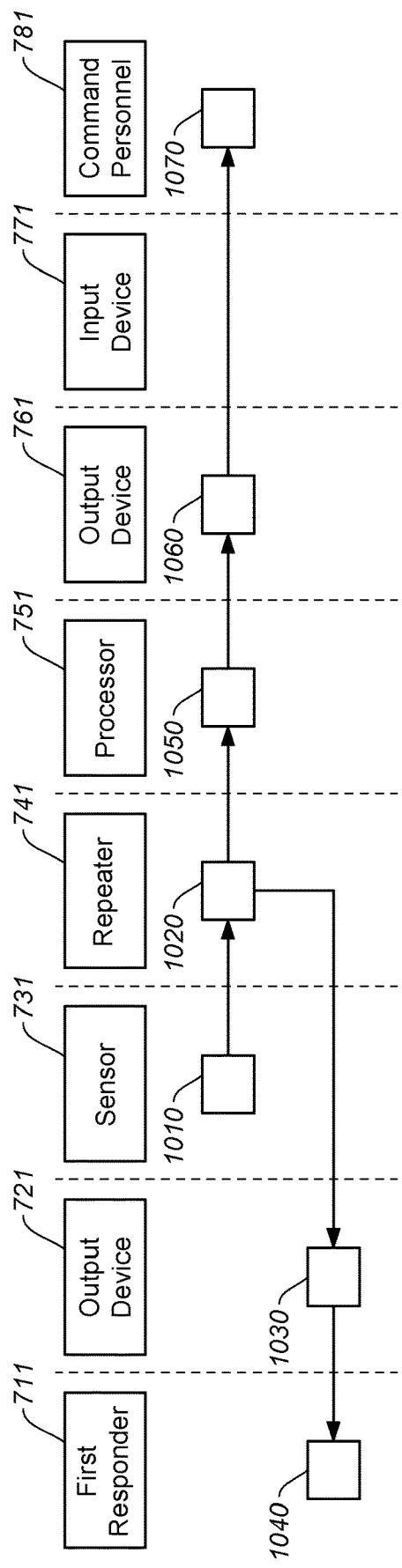

FIG. 10 is a swimming lane diagram schematically illustrating a method 1000 of communicating using a first responder system. One or more of the components participating in method 1000 is described in the singular. In alternative embodiments, one or more actions or functions may be performed by multiple components of the first responder system.

The method 1000 may be performed, for example, to transmit information based on environmental information to first responders and to an incident response command center or to command personnel at the response command center, or who are within or proximate to a building from which the local environment information is sensed and collected. For example, a sensor may provide environment information indicating a situation or emergency, and both first responders and command personnel at the response command center may receive a message indicating or based on the situation or emergency.

At 1010 a sensor 731 senses local environment information or conditions, and transmits electrical sense signals representing the local environment information or conditions, for example, as discussed in more detail elsewhere herein. The electrical sense signals are transmitted to a particular repeater 741. In some embodiments, the electrical sense signals are transmitted to the particular repeater 741 using one or more other repeaters 741.

At 1020, particular repeater 741 receives the electrical sense signals from sensor 731. Based at least partly on the electrical sense signals, the repeater generates signals for output device 721, for example, as discussed in more detail elsewhere herein. In addition, the particular repeater 741 transmits the signals to output device 761. In some embodiments, the particular repeater 741 generates the signals at least partly based on other information, such as other sensed environment aspect or condition information, and/or other information, for example, as discussed in more detail elsewhere herein.

In some embodiments, the signals are transmitted from the particular repeater 741 to output device 761 using one or more other repeaters 741, for example, as discussed in more detail elsewhere herein.

At 1030, output device 721 receives the signals transmitted from the particular repeater 741. In addition, output device 721 is caused by the signals received from particular repeater 741 to communicate information corresponding with the received signals, for example, as discussed in more detail elsewhere herein.

At 1040, a first responder 711, for example, in a building, perceives information transmitted from the processor 751 because of the information communicated by output device 721.

At 1050, processor 751 also receives the electrical sense signals transmitted from sensor 731 via one or more repeaters 741, where the one or more repeaters may or may not include the particular repeater 741 discussed above. In addition, processor 751 processes the electrical signals, and generates signals for output device 761, for example, as discussed in more detail elsewhere herein.

At 1060, output device 761 receives the signals from processor 751. In addition, output device 761 is caused by the signals received from processor 751 to communicate information representing the local environment information sensed by sensor 731, for example, as discussed in more detail elsewhere herein.

At 1070, command personnel 781 at the incident response command location perceive the sensed local environment information because of the information communicated by the output device 761.

Figure 11:
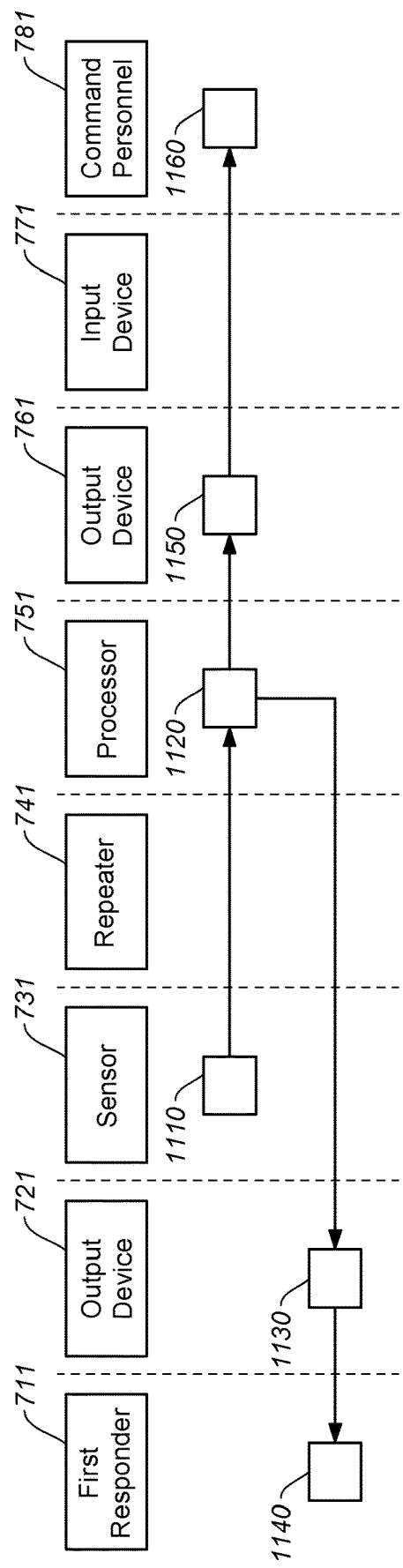

FIG. 11 is a swimming lane diagram schematically illustrating a method 1100 of communicating using a first responder system. One or more of the components participating in method 1100 is described in the singular. In alternative embodiments, one or more actions or functions may be performed by multiple components of the first responder system.

The method 1100 may be performed, for example, to transmit information based on environmental information to first responders and to an incident response command center or to command personnel at the response command center, or who are within or proximate to a building from which the local environment information is sensed and collected. For example, a sensor may provide environment information indicating a situation or emergency, and both first responders and command personnel at the response command center may receive a message indicating or based on the situation or emergency.

At 1110 a sensor 731 senses local environment aspects or conditions, and transmit electrical sense signals representing the local environment aspects or conditions, for example, as discussed in more detail elsewhere herein. The electrical sense signals are transmitted to processor 751. In some embodiments, the electrical sense signals are transmitted to processor 751 using one or more repeaters 741.

At 1120, processor 751 receives the electrical sense signals transmitted from sensor 731. In addition, processor 751 processes the electrical signals, and generates signals for output device 761, for example, as discussed in more detail elsewhere herein.

At 1130, output device 721 receives the signals transmitted from the processor 751. In some embodiments, the signals from the processor 751 are transmitted to output device 721 using one or more repeaters 741. In addition, output device 721 is caused by the signals received from processor 751 to communicate information corresponding with the received signals, for example, as discussed in more detail elsewhere herein.

At 1140, a first responder 711, for example, in a building, perceives information transmitted from the processor 751 because of the information communicated by output device 721.

At 1150, output device 761 receives signals from processor 751. In addition, output device 761 is caused by the signals received from processor 751 to communicate information representing the local environment information sensed by sensor 731, for example, as discussed in more detail elsewhere herein.

At 1160, command personnel 781 at the incident response command location perceive the sensed local environment information because of the information communicated by output device 761.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system for communicating between a building and a first responder, the system comprising: a plurality of sensors, each of the plurality of sensors being in a fixed position in the building and configured to sense sound within an environment of the building, and to transmit a sense signal representing the sensed sound, each of the plurality of sensors having a sensor processor to filter the sensed sound to determine a particular sound from the fixed position; one or more repeaters, configured to receive the sense signals from the sensors and to transmit repeated sense signals representing the sensed sound; a processor, configured to receive the repeated sense signals and determine that a predetermined amount of time has passed since the sense signal was generated, and to transmit an output signal based at least in part on one or more of the repeated sense signals and at least in part on the predetermined amount of time; and one or more output devices configured to receive the output signal and to communicate information associated with the sensed sound and fixed position based on the output signal.

2. The system in accordance with claim 1, wherein one or more of the sensors is integrated into a housing with one or more of the repeaters.

3. The system in accordance with claim 1, wherein one or more of the sensors is integrated into a housing with one or more of the output devices.

4. The system in accordance with claim 1, wherein one or more of the repeaters is integrated into a housing with one or more of the output devices.

5. The system in accordance with claim 1, wherein one or more of the sensors is fixed at a location within the building.

6. The system in accordance with claim 1, wherein one or more of the sensors is movable within the building.

7. The system in accordance with claim 1, wherein one or more of the sensors is configured for being attached to the first responder.

8. The system in accordance with claim 1, wherein one or more of the sensors is configured to sense an environmental aspect or condition.

9. The system in accordance with claim 1, wherein one or more of the output devices are configured to communicate the information to the first responder.

10. The system in accordance with claim 1, wherein the at least one repeater is further configured to receive the output signal from the processor and to transmit a repeated output signal.

11. The system in accordance with claim 10, wherein at least one of the output devices is configured to receive the repeated output signal and to communicate information based on the repeated output signal.

12. The system in accordance with claim 11, wherein the at least one output device is configured to communicate the information to at least one of the first responder and another first responder.

13. The system in accordance with claim 11, wherein one or more of the output devices are configured to communicate the information to an incident response command personnel individual.

14. A method of communicating between a building and a first responder, the method comprising:

with a plurality of sensors each being at a fixed location within the building, sensing sound within an environment of the building;

with a sensor processor, filtering the sensed sound to determine a particular sound from the fixed location;

with the sensors, transmitting a sense signal representing the sensed sound;

with one or more repeaters, receiving the sense signal;

with the one or more repeaters, transmitting a repeated sense signal representing the sensed sound;

with a processor, receiving the repeated sense signal and determining that a predetermined amount of time has passed since the sense signal is generated;

with the processor, transmitting an output signal based at least in part on the repeated sense signal and the predetermined amount of time;

with one or more output devices, receiving the output signal; and with the one or more output devices, communicating information based on the received output signal.

15. The method in accordance with claim 14, wherein one or more of the sensors is integrated into a housing with one or more of the repeaters.

16. The method in accordance with claim 14, wherein one or more of the sensors is integrated into a housing with one or more of the output devices.

17. The method in accordance with claim 14, wherein one or more of the repeaters is integrated into a housing with one or more of the output devices.

18. The method in accordance with claim 14, wherein one or more of the sensors is fixed at a location within the building.

19. The method in accordance with claim 14, wherein one or more of the sensors is movable within the building.

20. The method in accordance with claim 14, wherein one or more of the sensors is attached to the first responder.

21. The method in accordance with claim 14, further comprising, with the sensors, sensing an environmental aspect or condition of the building.

22. The method in accordance with claim 14, further comprising, with the sensors, sensing an aspect or condition of the first responder.

23. The method in accordance with claim 14, further comprising, with one or more of the output devices communicating the information to at least one of the first responder and another first responder.

24. The method in accordance with claim 14, further comprising, with one or more of the output devices communicating the information to an incident response command.

25. The method in accordance with claim 14, further comprising:

with at least one of the repeaters, receiving the output signal from the processor; and with at least one of the repeaters, transmitting a repeated output signal.

* * * * *